US012511338B2

(12) United States Patent
Qian et al.

(10) Patent No.: US 12,511,338 B2
(45) Date of Patent: Dec. 30, 2025

(54) CONFERENCE INFORMATION QUERY METHOD AND APPARATUS, STORAGE MEDIUM, TERMINAL DEVICE, AND SERVER

(71) Applicant: BEIJING ZITIAO NETWORK TECHNOLOGY CO., LTD., Beijing (CN)

(72) Inventors: Cheng Qian, Beijing (CN); Mengyuan Xiong, Beijing (CN); Kojung Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 18/271,229

(22) PCT Filed: Dec. 17, 2021

(86) PCT No.: PCT/CN2021/139076
§ 371 (c)(1),
(2) Date: Jul. 6, 2023

(87) PCT Pub. No.: WO2022/148227
PCT Pub. Date: Jul. 14, 2022

(65) Prior Publication Data
US 2024/0061899 A1 Feb. 22, 2024

(30) Foreign Application Priority Data

Jan. 8, 2021 (CN) .......................... 202110026063.4

(51) Int. Cl.
*G06F 16/9538* (2019.01)
*G06F 16/9535* (2019.01)

(52) U.S. Cl.
CPC ...... *G06F 16/9538* (2019.01); *G06F 16/9535* (2019.01)

(58) Field of Classification Search
None
See application file for complete search history.

(56) References Cited

U.S. PATENT DOCUMENTS

| 7,984,034 | B1 * | 7/2011 | Shaw ................. G06F 16/3337 707/726 |
| 10,178,422 | B1 * | 1/2019 | Panchaksharaiah ... G11B 27/00 |

(Continued)

FOREIGN PATENT DOCUMENTS

| CN | 101000617 A | 7/2007 |
| CN | 103067775 A | 4/2013 |

(Continued)

OTHER PUBLICATIONS

NPL-ITHelpBrown, "Audio Transcripts for Zoom Meetings", Mar. 16, 2020 (Year: 2020).*

(Continued)

*Primary Examiner* — Aleksandr Kerzhner
*Assistant Examiner* — Anugeetha Kunjithapatham
(74) *Attorney, Agent, or Firm* — BakerHostetler

(57) ABSTRACT

A conference information query method and apparatus, a storage medium, and a server. According to the method, a conference information query request is initiated in a terminal device, related conference information is queried on a server-side, matching is performed on subtitle sentences in a conference subtitle of the conference information during a query process, and matched subtitle sentences and time are together returned to the terminal device, such that the terminal device can correspondingly display, when displaying the conference information, a set of the matched subtitle sentences and the subtitle sentence time. Thus, the subtitle (Continued)

sentences in the conference information that are related to a query sentence are displayed on the terminal device.

17 Claims, 6 Drawing Sheets

(56) References Cited

U.S. PATENT DOCUMENTS

| | | | |
|---|---|---|---|
| 11,032,620 B1* | 6/2021 | Verma | G10L 15/1822 |
| 2003/0078766 A1* | 4/2003 | Appelt | G06F 16/3338 |
| | | | 707/E17.084 |
| 2007/0027862 A1 | 2/2007 | Meijer et al. | |
| 2008/0147613 A1* | 6/2008 | Sarukkai | G06F 16/735 |
| 2008/0303942 A1* | 12/2008 | Chang | H04N 7/025 |
| | | | 386/E5.052 |
| 2011/0270877 A1 | 11/2011 | Kim | |
| 2012/0296914 A1* | 11/2012 | Romanov | H04L 12/1831 |
| | | | 707/E17.101 |
| 2015/0019203 A1* | 1/2015 | Smith | H04N 21/4722 |
| | | | 704/9 |
| 2015/0106091 A1* | 4/2015 | Wetjen | G10L 15/26 |
| | | | 704/235 |
| 2015/0302006 A1* | 10/2015 | Sasidharan | G06F 16/41 |
| | | | 707/741 |
| 2021/0014575 A1* | 1/2021 | Selfors | H04N 21/47202 |
| 2021/0281920 A1* | 9/2021 | Verma | G06F 16/738 |

FOREIGN PATENT DOCUMENTS

| | | |
|---|---|---|
| CN | 103984772 A | 8/2014 |
| CN | 108897861 A | 11/2018 |
| CN | 109302576 A | 2/2019 |
| CN | 109710859 A | 5/2019 |
| CN | 110287364 A | 9/2019 |
| CN | 111177463 A | 5/2020 |
| CN | 112765460 A | 5/2021 |

OTHER PUBLICATIONS

Written Opinion for International Application No. PCT/CN2021/139076, mailed Apr. 20, 2022, 09 Pages.

International Patent Application No. PCT/CN2021/139076; Int'l Search Report; dated Mar. 1, 2022; 2 pages.

Wang Chaohui et al.; "Based on CAT and Corpus Technology"; Xiamen University Press; Oct. 2016; p. 11 and 12 (contains English Translation).

* cited by examiner

CONFERENCE INFORMATION QUERY METHOD AND APPARATUS, STORAGE MEDIUM, TERMINAL DEVICE, AND SERVER

CROSS REFERENCE

The disclosure is the U.S. National Stage of International Application No. PCT/CN2021/139076, titled "CONFERENCE INFORMATION QUERY METHOD AND APPARATUS, STORAGE MEDIUM, TERMINAL DEVICE, AND SERVER", filed on Dec. 17, 2021, which claims priority to Chinese Patent Application No. 202110026063.4, field on Jan. 8, 2021, titled "CONFERENCE INFORMATION QUERY METHOD AND APPARATUS, STORAGE MEDIUM, TERMINAL DEVICE, AND SERVER", the entire contents of both of which are incorporated herein by reference.

TECHNICAL FIELD

Embodiments of the present disclosure relate to the field of information retrieval technology, and specifically to a conference information query method and apparatus, a storage medium, a terminal device, and a server.

BACKGROUND

With the rapid development of audio and video conferences, more and more people are using audio and video conference applications for audio and video communications. Mass conference information may be presented in the audio and video conference applications, and users may select some conference information to view specific details.

SUMMARY

Embodiments of the disclosure provide a conference information query method and apparatus, storage medium, terminal device, and server.

The first aspect of the disclosure provides a conference information query method, applied to a terminal device, comprising: in response to detecting a conference query operation, generating a conference query request based on a query statement corresponding to the conference query operation; sending the conference query request to a server; and presenting each conference query result in response to receiving a set of conference query results that is sent by the server in response to the conference query request, wherein the conference query results comprise a set of hit subtitle sentences and subtitle sentence time corresponding to each hit subtitle sentence.

In some optional embodiments, the in response to detecting a conference query operation, generating a conference query request based on a query statement corresponding to the conference query operation comprises: presenting a set of conference information corresponding to a current login user identifier on a global conference information page; and generating the conference query request based on the query statement in response to detecting the query statement input by a user on the global conference information page.

In some optional embodiments, wherein the presenting each conference query result comprises: presenting each conference query result on the global conference information page; or jumping to a conference information detail page to present each conference query result.

In some optional embodiments, wherein the method further comprises: jumping to the conference information detail page in response to detecting a selecting operation on a hit subtitle sentence presented on the global conference information page, presenting the conference query result corresponding to the selected hit subtitle sentence on the conference information detail page, and playing a conference audio and video corresponding to the selected hit subtitle sentence from the subtitle sentence time corresponding to the selected hit subtitle sentence.

In some optional embodiments, wherein the method further comprises: jumping to the conference information detail page in response to detecting a selecting operation on a target conference query result presented on the global conference information page, and presenting the target conference query result on the conference information detail page.

In some optional embodiments, wherein the method further comprises: in response to detecting a selecting operation on a hit subtitle sentence in the target conference query result presented on the conference information detail page, playing a conference audio and video corresponding to the target conference query result on the conference information detail page from the subtitle sentence time corresponding to the selected subtitle sentence.

In some optional embodiments, wherein the generating a conference query request based on a query statement corresponding to the conference query operation comprises: obtaining a current language class identifier of the terminal device; and generating the conference query request based on the query statement corresponding to the conference query operation and the current language class identifier.

In some optional embodiments, wherein the method further comprises: presenting a language class setting interface in response to detecting a preset language class setting operation, and determining a language class identifier input by the user in the language class setting interface as the current language class identifier.

In some optional embodiments, wherein the conference query results further comprise to-be-highlighted content; and the presenting each conference query result comprises: presenting the to-be-highlighted content in each conference query result in a preset highlighting manner, and presenting non-to-be-highlighted content in each conference query result in a preset conventional display manner.

The second aspect of the disclosure provides a conference information query method, applied to a server, comprising: in response to receiving a conference query request sent by a terminal device, querying conference information matching the conference query request, to obtain a subset of conference information, wherein the conference query request comprises a query statement, the conference information comprises a conference identifier and a conference subtitle, and the conference subtitle comprises a sequence of subtitle sentences and a corresponding sequence of subtitle sentence time that sequentially consists of subtitle sentence time corresponding to each subtitle sentence in the sequence of subtitle sentences; for the conference information in the subset of conference information, determining each subtitle sentence matching the query statement in the sequence of subtitle sentences of the conference information as a hit subtitle sentence corresponding to the conference information; generating conference query results by using each hit subtitle sentence corresponding to the conference information in the subset of conference information and corresponding subtitle sentence time, to obtain a set of conference query results; and sending the set of conference query results to the terminal device.

In some optional embodiments, wherein the method further comprises: in response to receiving an audio and video playback request sent by the terminal device, sending conference audio and video data corresponding to the conference identifier in the audio and video playback request to the terminal device, starting from the subtitle sentence time in the audio and video playback request, wherein the audio and video playback request is triggered by the terminal device in response to a user's selecting operation on the conference query result in the set of presented conference query results.

In some optional embodiments, wherein the conference information comprises at least one information item, and the at least one information item comprises the conference identifier, the sequence of subtitle sentences, and the sequence of subtitle sentence time; and the querying conference information matching the conference query request, to obtain a subset of conference information comprises: for conference information, determining degrees of matching between the information items comprised in the conference information and the query statement, and determining a degree of matching between the conference information and the query statement according to the degrees of matching between the information items comprised in the conference information and the query statement; and determining the subset of conference information matching the conference query request according to the degree of matching between the conference information and the query statement.

In some optional embodiments, wherein the conference query request further comprises a current language class identifier set by the user in the terminal device to represent a current language class, and the conference subtitle further comprises a sequence of subtitle sentence language class identifiers consisting of subtitle sentence language class identifiers used to represent a subtitle sentence language class corresponding to each subtitle sentence in the sequence of subtitle sentences comprised in the conference subtitle; and the for conference information, determining degrees of matching between the information items comprised in the conference information and the query statement comprises: for the conference information, determining a degree of matching between the conference subtitle in the conference information and the query statement according to a degree of matching between a target language class subtitle sentence in the conference information and the query statement, wherein the target language class subtitle sentence is a subtitle sentence, the corresponding subtitle sentence language class identifier of which is the current language class identifier, in the sequence of subtitle sentences in the conference subtitle of the conference information.

In some optional embodiments, wherein the conference information further comprises phonetic annotation information of a preset number of language classes corresponding to a basic text information item in at least one basic text information item; the conference query request further comprises a current language class identifier set by the user in the terminal device to represent a current language class; and the for conference information, determining degrees of matching between the information items comprised in the conference information and the query statement comprises: for the conference information, determining a degree of matching between the basic text information item in the conference information and the query statement according to a degree of matching between the query statement and the basic text information item of the conference information and/or the phonetic annotation information of the language class indicated by the current language class identifier corresponding to the basic text information item.

In some optional embodiments, wherein the conference information further comprises at least one of the following information items: conference title information and conference comment information; and the conference information comprises at least one of the following basic text information items: a participant name and the sequence of subtitle sentences.

In some optional embodiments, wherein the determining a degree of matching between the conference information and the query statement according to the degrees of matching between the information items comprised in the conference information and the query statement comprises: for the conference information, weighting and summing the degrees of matching between the information items comprised in the conference information and the query statement according to preset weights of the information items comprised in the conference information, and determining the weighted sum result as the degree of matching between the conference information and the query statement.

In some optional embodiments, wherein the conference information is generated through the following steps: for a sequence of to-be-stored subtitle sentences corresponding to a to-be-stored conference identifier and a corresponding sequence of to-be-stored subtitle sentence time, segmenting each to-be-stored subtitle sentence according to a segmentation method corresponding to the language class of the to-be-stored subtitle sentence, to obtain a sequence of subtitle sentence segments corresponding to the to-be-stored subtitle sentence; generating the sequence of to-be-stored subtitle sentences by using the sequence of subtitle sentence segments corresponding to each to-be-stored subtitle sentence in order of appearance of the corresponding to-be-stored subtitle sentences in the sequence of to-be-stored subtitle sentences, where an element in the sequence of to-be-stored subtitle sentences is the sequence of subtitle sentence segments of the to-be-stored subtitle sentence corresponding to the element; generating a sequence of to-be-stored subtitle language class identifiers by using a language class identifier corresponding to each to-be-stored subtitle sentence in order of appearance of the corresponding to-be-stored subtitle sentences in the sequence of to-be-stored subtitle sentences; and generating the conference information by using the to-be-stored conference identifier, the sequence of to-be-stored subtitle sentences, the sequence of to-be-stored subtitle sentence time, and the sequence of to-be-stored subtitle language class identifiers, and storing the conference information.

In some optional embodiments, wherein the generating conference query results by using a conference identifier corresponding to the conference information in the subset of conference information, each hit subtitle sentence, and corresponding subtitle sentence time, to obtain a set of conference query results comprises: for the conference information in the subset of conference information, marking information items matching the query statement among the information items comprised in the conference information as to-be-highlighted content of the conference information; and generating the conference query results by using each hit subtitle sentence corresponding to the conference information in the subset of conference information, the corresponding subtitle sentence time, and the to-be-highlighted content.

The third aspect of the disclosure provides a conference information query apparatus, applied to a terminal device, comprising: a request generation unit, configured to generate, in response to detecting a conference query operation, a conference query request based on a query statement corresponding to the conference query operation; a request sending unit, configured to send the conference query request to a server; and a result presentation unit, configured to present each conference query result in response to receiving a set of conference query results that is sent by the server in response to the conference query request, wherein the conference query results comprise a set of hit subtitle sentences and subtitle sentence time corresponding to each hit subtitle sentence.

In some optional embodiments, the request generation unit is further configured to: presenting a set of conference information corresponding to a current login user identifier on a global conference information page; and generating the conference query request based on the query statement in response to detecting the query statement input by a user on the global conference information page.

In some optional embodiments, the result presentation unit is further configured to: presenting each conference query result on the global conference information page; or jumping to a conference information detail page to present each conference query result.

In some optional embodiments, the apparatus further comprises: a global page selection and detail page playback unit, configured to jumping to the conference information detail page in response to detecting a selecting operation on a hit subtitle sentence presented on the global conference information page, presenting the conference query result corresponding to the selected hit subtitle sentence on the conference information detail page, and playing a conference audio and video corresponding to the selected hit subtitle sentence from the subtitle sentence time corresponding to the selected hit subtitle sentence.

In some optional embodiments, wherein the apparatus further comprises: a global page selection and detail page presentation unit, configured to jump to the conference information detail page in response to detecting a selecting operation on a target conference query result presented on the global conference information page, and present the target conference query result on the conference information detail page.

In some optional embodiments, the apparatus further comprises: a detail page selection and playback unit, configured to play, in response to detecting a selecting operation on a hit subtitle sentence in the target conference query result presented on the conference information detail page, a conference audio and video corresponding to the target conference query result on the conference information detail page from the subtitle sentence time corresponding to the selected subtitle sentence.

In some optional embodiments, the request generation unit is further configured to: obtain a current language class identifier of the terminal device, and generate the conference query request based on the query statement corresponding to the conference query operation and the current language class identifier.

In some optional embodiments, the apparatus further comprises: a language class determination unit, configured to present a language class setting interface in response to detecting a preset language class setting operation, and determine a language class identifier input by the user in the language class setting interface as the current language class identifier.

In some optional embodiments, the conference query results further comprise to-be-highlighted content; and the result presentation unit is further configured to: present the to-be-highlighted content in each conference query result in a preset highlighting manner, and present non-to-be-highlighted content in each conference query result in a preset conventional display manner.

The fourth aspect of the disclosure provides a conference information query apparatus, applied to server, the apparatus comprises: an information query unit, configured to query, in response to receiving a conference query request sent by a terminal device, conference information matching the conference query request, to obtain a subset of conference information, where the conference information includes a conference identifier and a conference subtitle, and the conference subtitle includes a sequence of subtitle sentences and a corresponding sequence of subtitle sentence time that sequentially consists of subtitle sentence time corresponding to each subtitle sentence in the sequence of subtitle sentences; a hit determination unit, configured to determine, for the conference information in the subset of conference information, each subtitle sentence matching a query statement in the sequence of subtitle sentences of the conference information as a hit subtitle sentence corresponding to the conference information; a result generation unit, configured to generate conference query results by using each hit subtitle sentence corresponding to the conference information in the subset of conference information and corresponding subtitle sentence time, to obtain a set of conference query results; and a result sending unit, configured to send the set of conference query results to the terminal device.

In some optional embodiments, the apparatus further comprises: an audio and video sending unit, configured to send, in response to receiving an audio and video playback request sent by the terminal device, conference audio and video data corresponding to a conference identifier in the audio and video playback request to the terminal device, starting from the subtitle sentence time in the audio and video playback request, where the audio and video playback request is triggered by the terminal device in response to a user's selecting operation on the conference query result in the set of presented conference query results.

In some optional embodiments, the conference information comprises at least one information item, and the at least one information item may include the conference identifier, the sequence of subtitle sentences, and the sequence of subtitle sentence time; and the information query unit is further configured to: for conference information, determine degrees of matching between the information items included in the conference information and the query statement, and determine a degree of matching between the conference information and the query statement according to the degrees of matching between the information items included in the conference information and the query statement; and determine the subset of conference information matching the conference query request according to the degree of matching between the conference information and the query statement.

In some optional embodiments, the conference query request further comprises a current language class identifier set by the user in the terminal device to represent a current language class, and the conference subtitle may further include a sequence of subtitle sentence language class identifiers consisting of subtitle sentence language class identifiers used to represent a subtitle sentence language class corresponding to each subtitle sentence in the sequence of subtitle sentences included in the conference subtitle; and for conference information, determining degrees of matching between the information items included in the conference information and the query statement comprises: for the conference information, determining a degree of matching between the conference subtitle in the conference information and the query statement according to a degree of matching between a target language class subtitle sentence in the conference information and the query statement, where the target language class subtitle sentence is a subtitle sentence, the corresponding subtitle sentence language class identifier of which is the current language class identifier, in the sequence of subtitle sentences in the conference subtitle of the conference information.

In some optional embodiments, the conference information further comprise phonetic annotation information of a preset number of language classes corresponding to a basic text information item in at least one basic text information item; the conference query request further comprise a current language class identifier set by the user in the terminal device to represent a current language class; and for conference information, determining degrees of matching between the information items included in the conference information and the query statement comprise: for the conference information, determining a degree of matching between the basic text information item in the conference information and the query statement according to a degree of matching between the query statement and the basic text information item of the conference information and/or the phonetic annotation information of the language class indicated by the current language class identifier corresponding to the basic text information item.

In some optional embodiments, the conference information further comprise at least one of the following information items: conference title information and conference comment information; and the conference information include at least one of the following basic text information items: a participant name and the sequence of subtitle sentences.

In some optional embodiments, the determining a degree of matching between the conference information and the query statement according to the degrees of matching between the information items included in the conference information and the query statement may include: for the conference information, weighting and summing the degrees of matching between the information items included in the conference information and the query statement according to preset weights of the information items included in the conference information, and determining the weighted sum result as the degree of matching between the conference information and the query statement.

In some optional embodiments, the conference information is generated through the following steps: for a sequence of to-be-stored subtitle sentences corresponding to a to-be-stored conference identifier and a corresponding sequence of to-be-stored subtitle sentence time, segmenting each to-be-stored subtitle sentence according to a segmentation method corresponding to the language class of the to-be-stored subtitle sentence, to obtain a sequence of subtitle sentence segments corresponding to the to-be-stored subtitle sentence; generating the sequence of to-be-stored subtitle sentences by using the sequence of subtitle sentence segments corresponding to each to-be-stored subtitle sentence in order of appearance of the corresponding to-be-stored subtitle sentences in the sequence of to-be-stored subtitle sentences, where an element in the sequence of to-be-stored subtitle sentences is the sequence of subtitle sentence segments of the to-be-stored subtitle sentence corresponding to the element; generating a sequence of to-be-stored subtitle language class identifiers by using a language class identifier corresponding to each to-be-stored subtitle sentence in order of appearance of the corresponding to-be-stored subtitle sentences in the sequence of to-be-stored subtitle sentences; and generating the conference information by using the to-be-stored conference identifier, the sequence of to-be-stored subtitle sentences, the sequence of to-be-stored subtitle sentence time, and the sequence of to-be-stored subtitle language class identifiers, and storing the conference information.

In some optional embodiments, the generating conference query results by using a conference identifier corresponding to the conference information in the subset of conference information, each hit subtitle sentence, and corresponding subtitle sentence time, to obtain a set of conference query results include: for the conference information in the subset of conference information, marking information items matching the query statement among the information items included in the conference information as to-be-highlighted content of the conference information; and generating the conference query results by using each hit subtitle sentence corresponding to the conference information in the subset of conference information, the corresponding subtitle sentence time, and the to-be-highlighted content.

The fifth aspect of the disclosure provides a terminal device, comprising: one or more processors; and a storage apparatus, storing one or more programs, wherein when the one or more programs are performed by the one or more processors, the one or more processors are enabled to implement the method according to any one of the first aspect.

The sixth aspect of the disclosure provides a server, comprising: one or more processors; and a storage apparatus, storing one or more programs, wherein when the one or more programs are performed by the one or more processors, the one or more processors are enabled to implement the method according to any one of the second aspect.

The seventh aspect of the disclosure provides a computer-readable storage medium, storing a computer program, wherein when the computer program is performed by one or more processors, the method according to any one of the first aspect and/or the method according to any one of the second aspect are implemented.

The eighth aspect of the disclosure provides a conference information query system, comprising the terminal device according to any one of the fifth aspect and the server according to any one of the sixth aspect.

The existing technology of audio and video conferencing applications, often unified conference information presented in the form of a list, users want to find a specified conference, often need to check the conference information list, or even need to turn the page to find the desired conference information, resulting in low efficiency of conference information search.

According to the conference information query method and apparatus, the storage medium, the terminal device, and the server provided in the embodiments of the present disclosure, a conference information query request is initiated in a terminal device, related conference information is queried on a server, each subtitle sentence in a conference subtitle of conference information is matched in a query process, high subtitle sentences and hit subtitle sentence time are returned to the terminal device together, and the terminal device may correspondingly present a set of hit subtitle sentences and subtitle sentence time when presenting the conference information. Therefore, subtitle sentences related to a query statement in conference information can be presented on a terminal device.

BRIEF DESCRIPTION OF THE DRAWINGS

Other features, objects and advantages of the present disclosure will become more apparent by reading the detailed description of the non-limiting embodiments made with reference to the following accompanying drawings. The accompanying drawings are for the purpose of illustrating specific embodiments only and are not considered to be limiting of the present invention. In the accompanying drawings.

DETAILED DESCRIPTION OF PREFERRED EMBODIMENTS

The present disclosure is described in further detail below in connection with the accompanying drawings and embodiments. It will be understood that the specific embodiments described herein are intended only to explain the invention in question and are not intended to limit it. It is also to be noted that, for ease of description, only those portions of the accompanying drawings which relate to the invention in question are shown.

It is to be noted that the embodiments and the features in the embodiments in the present disclosure may be combined with each other without conflict. The present disclosure will be described in detail below with reference to the accompanying drawings and in connection with the embodiments.

Figure 1:
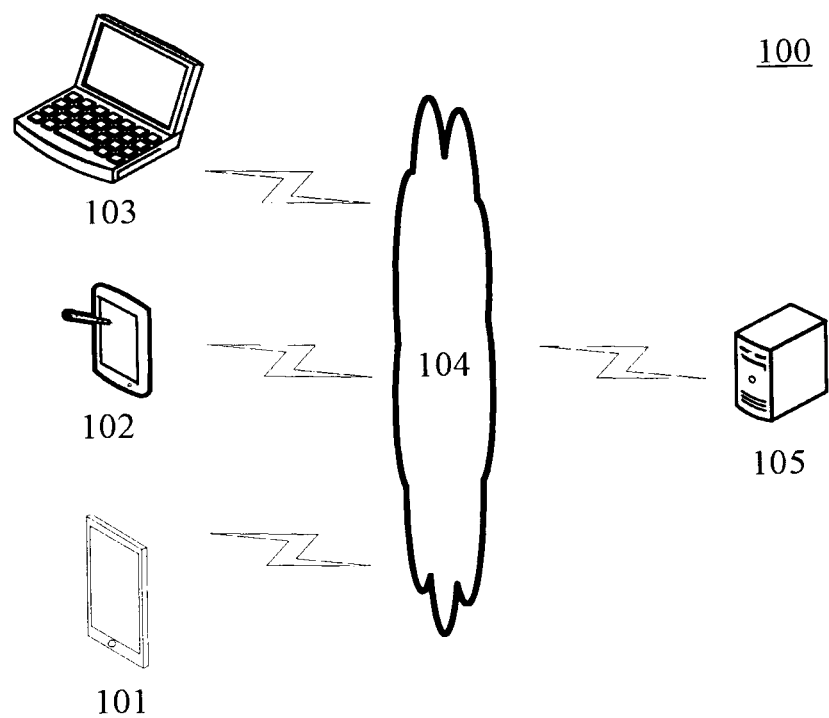
FIG. 1 is a system architecture diagram of an embodiment of a conference information query system according to the present disclosure.

FIG. 1 illustrates an exemplary system architecture 100 that may be applied to an embodiment of a conference information query system of the present disclosure.

As shown in FIG. 1, the conference information query system 100 may include a terminal device 101, 102, or 103, a network 104, and a server 105. The network 104 serves as a medium providing a communication link between the terminal device 101, 102, or 103 and the server 105. The network 104 may include various types of connections, such as wired or wireless communication links or optical fiber cables.

A user may use the terminal device 101, 102, or 103 to interact with the server 105 through the network 104 to receive or send messages and the like. The terminal device 101, 102, or 103 may be installed with various communication client applications, such as audio and video conference applications, voice recognition applications, web browser applications, shopping applications, search applications, instant messaging tools, email clients, and social platform software.

The terminal device 101, 102, or 103 may be hardware or software. When the terminal device 101, 102, or 103 is hardware, it may be various types of electronic devices that have displays and support sound and/or video capture, including but not limited to a smart phone, a tablet computer, an e-book reader, an MP3 (Moving Picture Experts Group Audio Layer III) player, an MP4 (Moving Picture Experts Group Audio Layer IV) player, a laptop computer, a desktop computer, and the like. When the terminal device 101, 102, or 103 is software, it may be installed in the listed electronic devices. The terminal device may be implemented as a plurality of software programs or software modules (for example, for providing distributed services), or as a single software program or software module. Specific limitations are not provided here.

The server 105 may be a server that provides various services, such as a background server that supports audio and video conference applications displayed on the terminal device 101, 102, or 103. The background server may analyze the received data such as a conference query request, and feed back processing results (such as a set of conference query results) to the terminal device.

It should be noted that the server 105 may be hardware or software. When the server 105 is hardware, it may be implemented as a distributed server cluster composed of a plurality of servers, or as a single server. When the server is software, it may be implemented as a plurality of software programs or software modules (for, example, for providing distributed services), or as a single software program or software module. Specific limitations are not provided here.

It should be noted that a conference query method applied to a terminal device, provided in the present disclosure, is generally performed by the terminal device 101, 102, or 103. Correspondingly, a conference query apparatus applied to a terminal device is generally disposed in the terminal device 101, 102, or 103.

It should be noted that a conference query method applied to a server, provided in the present disclosure, is generally performed by the server 105. Correspondingly, a conference query apparatus applied to a server is generally disposed in the server 105.

It should be understood that the numbers of the terminal devices, the network, and the server in FIG. 1 is merely illustrative. According to implementation requirements, there may be any number of terminal devices, networks, and servers.

Figure 2A:
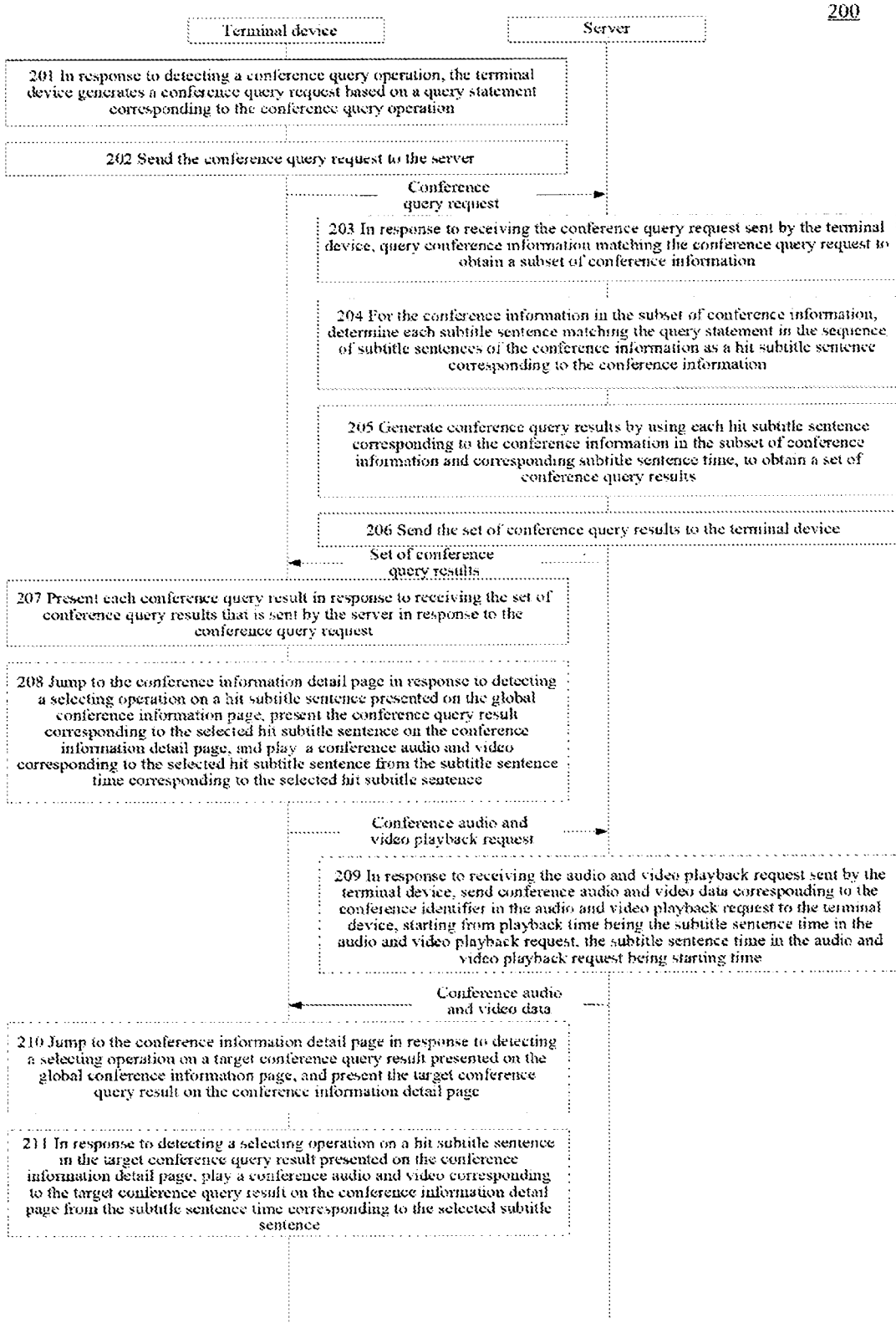
FIG. 2A is a timing diagram of an embodiment of the conference information query system according to the present disclosure.

Continue to refer to FIG. 2A, which illustrates a time series 200 of an embodiment of a conference information query system according to the present disclosure. The conference information query system in the embodiment of the present disclosure may include a terminal device and a server. The time series 200 includes the following steps:

Step 201: In response to detecting a conference query operation, the terminal device generates a conference query request based on a query statement corresponding to the conference query operation.

In this embodiment, the terminal device (for example, the terminal device 101, 102, or 103 shown in FIG. 1) may generate, upon detecting the conference query operation, the conference query request based on the query statement corresponding to the conference query operation. For example, the conference query request may include the query statement corresponding to the conference query operation. For another example, the conference query request may further include a current login user identifier of the terminal device. The current login user identifier is used to indicate a user who is currently logged in and authorized to log in after being verified by an audio and video conference server.

Here, the conference query operation may be various preset operations that may trigger query of conference information related to the query statement.

For example, the conference query operation may be that the user inputs the query statement in a search box and clicks a conference query operation display object (for example, a preset conference query button, an icon, or a specified key on a keyboard).

For another example, the conference query operation may alternatively be that the user speaks a voice corresponding to the query statement. For example, the user may speak the voice corresponding to "Help me check the conferences attended by Zhang San", the foregoing executive subject may first collect voice data spoken by the user, and then automatically recognize the collected voice data to obtain the query statement corresponding to the conference query operation, so as to generate the conference query request.

Step 202: The terminal device sends the conference query request to the server.

In this embodiment, the terminal device may send the conference query request generated in step 201 to the server that provides a conference query service.

Step 203: In response to receiving the conference query request sent by the terminal device, the server queries conference information matching the conference query request to obtain a subset of conference information.

In this embodiment, the server (for example, the server 105 shown in FIG. 1) may query the conference information matching the conference query request upon receiving the conference query request sent by the terminal device, to obtain the subset of conference information. Here, the conference information is used to represent completed historical audio and video conferences. The conference information may also be used to represent an audio and video conference that has been scheduled but has not yet taken place, and may also be used to represent a current ongoing audio and video conference. The conference information may include a conference identifier and a conference subtitle, and the conference subtitle may include a sequence of subtitle sentences and a corresponding sequence of subtitle sentence time. The conference identifier is used to uniquely identify each piece of conference information. The conference identifier may include a letter, a digit, a symbol, or the like. In practice, in addition to the conference identifier and the conference subtitle, the conference information may further include other content items, for example, include but not limited to a conference title, conference comments, and participant information. In addition to the foregoing items, the conference information may alternatively include other information items, which are not specifically limited in the present disclosure.

Here, the sequence of subtitle sentences in the conference information may be a sequence of sentences obtained by segmenting subtitle text of the historical or current ongoing conference represented by the conference information. The sequence of subtitle sentence time may be a sequence corresponding to the sequence of subtitle sentences and used to represent subtitle starting time of each subtitle sentence in the sequence of subtitle sentences. Time of a subtitle sentence may be in various forms. For example, time of a subtitle sentence may be represented by a timestamp.

For example, subtitle text of a conference may be obtained through automatic voice recognition on voice data of the historical or current ongoing conference. Correspondingly, the subtitle text of the conference may be segmented to obtain a sequence of subtitle sentences, and text and audio alignment may be performed based on the sequence of subtitle sentences and the voice data of the historical or current ongoing conference to obtain a sequence of subtitle sentence time. It should be noted that the subtitle text of the conference may be segmented in various ways, which are not specifically limited here. For example, a rule-based method, a decision tree-based method, a manual annotation-based method, or a combination of the methods may be used. Similarly, text and audio alignment may be performed based on the sequence of subtitle sentences and the voice data of the historical or current ongoing conference in various ways, which are not specifically limited here. For example, an acoustic model-based method or a manual annotation-based method may be used. According to this optional implementation, the voice data of the historical or current ongoing conference may be automatically recognized to obtain a sequence of subtitle sentences and a sequence of subtitle sentence time of the historical or current ongoing conference.

In practice, the conference information may be stored in various forms. For example, for the convenience of retrieval, the conference information may be stored in an Elasticsearch engine. Correspondingly, the subtitle sentences in the sequence of subtitle sentences may also be stored in various forms, for example, the subtitle sentences themselves may be stored. For another example, for the convenience of retrieval, a sequence of subtitle sentence segments obtained by segmenting the subtitle sentences may also be stored. The sequence of subtitle sentences and the sequence of subtitle sentence segments may also be correspondingly stored.

Here, the server may query the conference information matching the conference query request in various ways to obtain the subset of conference information.

For example, when the conference query request includes the query statement and the current login user identifier of the terminal device, the conference information matching the query statement, corresponding to the current login user identifier, may be queried in a set of conference information to obtain the subset of conference information. Here, for example, the server may determine, for the conference information corresponding to the current login user identifier, whether there is any information item matching the query statement among all information items included in the conference information, and add the conference information to the subset of conference information if there is any matching information item, otherwise continue to determine the conference information corresponding to the next current login user identifier until the conference information corresponding to all the current login user identifiers is traversed. Here, whether an information item included in the conference information matches the query statement may also be determined in various ways, which are not specifically limited in the present application. For example, the information item may be determined to match the query statement in a case that the information item is identical to the query statement. The information item may alternatively be determined to match the query statement in a case that the similarity between the information item and the query statement is greater than a first preset similarity threshold.

For example, the server may alternatively first determine a degree of matching between the conference information and the query statement. For example, the conference information includes N items of information, where N is a positive integer. M items of information matching the query statement among the N items of information may be determined, and a quotient of M divided by N may be used as the degree of matching between the conference information and the query statement. Alternatively, a maximum, minimum, or average value of degrees of matching between the information items included in the conference information and the query statement may be determined as the degree of matching between the conference information and the query statement. Then, the conference information at a degree of matching the query statement greater than a preset matching threshold is added to the subset of conference information.

Through step 203, the server generates the subset of conference information matching the conference query request received from the terminal device.

Step 204: For the conference information in the subset of conference information, the server determines each subtitle sentence matching the query statement in the sequence of subtitle sentences of the conference information as a hit subtitle sentence corresponding to the conference information.

In this embodiment, the server may determine, for the conference information in the subset of conference information generated in step 203, each subtitle sentence matching the query statement in the sequence of subtitle sentences of the conference information as a hit subtitle sentence corresponding to the conference information. Whether the subtitle sentence matches the query statement may be determined in various ways. For example, the subtitle sentence and the query statement are determined to match in a case that the similarity between the two is greater than a second preset similarity threshold.

Step 205: The server generates conference query results by using each hit subtitle sentence corresponding to the conference information in the subset of conference information and corresponding subtitle sentence time, to obtain a set of conference query results.

In practice, in addition to the conference identifier and the conference subtitle, the conference information may further include other information items, for example, include but not limited to a conference title, conference comments, and participant information. When the conference query results are generated, other information items other than each hit subtitle sentence and the corresponding subtitle sentence time may alternatively be included according to practical needs, for example, the foregoing conference identifier, conference title, conference comments, participant information, and the like may be included.

Step 206: The server sends the set of conference query results to the terminal device.

From the foregoing description, it may be seen that the set of conference query results includes the hit subtitle sentences matching the query statement in the conference subtitle of the conference information in the subset of conference information and the corresponding subtitle sentence time. It may be understood that if the conference information in the subset of conference information does not include the hit subtitle sentences, the set of conference query results may also not include the hit subtitle sentences but include other information items required in practice.

Step 207: The terminal device presents each conference query result in response to receiving the set of conference query results that is sent by the server in response to the conference query request.

In this embodiment, the terminal device may present, in various ways, the set of conference query results received from the server upon receiving the set of query results returned by the server in response to the conference query request sent to the server in step 202. Here, the conference query results may include a set of hit subtitle sentences and corresponding subtitle sentence time corresponding to each hit subtitle sentence.

For example, the terminal device may present the conference query results in a tabular form. When each conference query result is presented, at least one item of the conference query results may be presented, that is, at least one item in the set of subtitle sentences and the subtitle sentence time corresponding to each hit subtitle sentence may be presented. It may be understood that when the conference query results further include other conference information items, the other information items may also be presented correspondingly, for example, the conference title, participant information, or conference comments may also be presented.

Through steps 201 to 207, it may be implemented on the terminal device that a query statement is input and a conference query request is submitted to the server, and conference query results are obtained after query of the server and returned to the terminal device, where the returned conference query results may include a set of subtitle sentences that hit the query statement in the conference subtitle and subtitle sentence time corresponding to each hit subtitle sentence, and then the terminal device may present specific subtitle sentences hit by the query statement in specific conferences and specific time when the hit subtitle sentences appear, so not only may the specific conferences matching the query statement be presented, but also the presented conference information content is enriched and the specific conference subtitle content matching the query statement and corresponding time may be presented in a targeted manner.

In some cases, this embodiment may have the following optional implementations:

Optional implementation (1): Step 201 may be performed as follows:

First, the terminal device presents a set of conference information corresponding to a current login user identifier on a global conference information page.

Here, the global conference information page presents the conference information corresponding to the current login user, which may include conference information of historical audio and video conferences of the current login user, audio and video conferences that have been scheduled but have not been held, and a current ongoing audio and video conference.

Second, in response to detecting a query statement input by a user on the global conference information page, the terminal device generates a conference query request based on the query statement.

That is, the global conference information page may provide the user with an operation object for inputting the query statement, such as a search box, for the user to input the query statement. The conference query request generated based on the query statement may include, for example, the current login user identifier and the query statement input by the user.

Optional implementation (2): Based on the foregoing optional implementation (1), step 207 may be performed as follows:

presenting each conference query result on the global conference information page; or jumping to a conference information detail page to present each conference query result.

That is, the global conference information page that originally presents the conference information corresponding to the current login user may present the conference query results received from the server, or the global conference information page may jump to the conference information detail page to present the conference query results received from the server.

Optional implementation (3): Based on the foregoing optional implementation (2), time series 200 may further include step 208 and step 209 below:

Step 208: The terminal device jumps to the conference information detail page in response to detecting a selecting operation on a hit subtitle sentence presented on the global conference information page, presents the conference query result corresponding to the selected hit subtitle sentence on the conference information detail page, and plays a conference audio and video corresponding to the selected hit subtitle sentence from the subtitle sentence time corresponding to the selected hit subtitle sentence.

That is, if each conference query result is presented on the global conference information page in the foregoing optional implementation (2), and the user selects the hit subtitle sentence in the global conference information page, it indicates that the user desires to reproduce the conference audio or video corresponding to the selected subtitle sentence. Therefore, the terminal device may jump to the conference information detail page, present the conference query result corresponding to the selected hit subtitle sentence on the conference information detail page, and play the conference audio or video corresponding to the selected hit subtitle sentence from the subtitle sentence time corresponding to the selected hit subtitle sentence. In practice, the terminal device may generate an audio and video playback request based on the conference identifier and subtitle sentence time corresponding to the hit subtitle sentence selected by the user in the global conference information page, and send the audio and video playback request to the server, to implement subsequent playback of the conference audio and video corresponding to the selected hit subtitle sentence from the subtitle sentence time corresponding to the selected hit subtitle sentence.

Step 209: In response to receiving the audio and video playback request sent by the terminal device, the server sends conference audio and video data corresponding to the conference identifier in the audio and video playback request to the terminal device, starting from playback time being the subtitle sentence time in the audio and video playback request, the subtitle sentence time in the audio and video playback request being starting time.

The server may send, upon receiving the audio and video playback request sent by the terminal device, the conference audio and video data corresponding to the conference identifier in the audio and video playback request to the terminal device, starting from the subtitle sentence time in the audio and video playback request. For example, if total playback time of the conference audio and video data corresponding to the conference identifier in the audio and video playback request is 60 minutes, and the subtitle sentence time in the audio and video playback request is 15 minutes and 01 seconds, the server may send the conference audio and video data corresponding to the conference identifier in the audio and video playback request to the terminal device, starting from 15 minutes and 01 seconds. In this way, the terminal device may parse and play the received conference audio and video data. Then, the terminal device plays the conference audio and video corresponding to the selected hit subtitle sentence from the subtitle sentence time corresponding to the selected hit subtitle sentence.

Through the optional implementation (3), the conference audio and video may be accurately positioned to the selected subtitle sentence on the global conference information page in the terminal device and played, thereby further improving efficiency of user conference information query.

Optional implementation (4): Based on the foregoing optional implementation (1), the time series 200 may further include step 210 and step 211 below:

Step 210: The terminal device jumps to the conference information detail page in response to detecting a selecting operation on a target conference query result presented on the global conference information page, and presents the target conference query result on the conference information detail page.

That is, if the user selects the target conference query result in the conference information corresponding to the current login user presented on the global conference information page of the terminal device, the terminal device may jump to the conference information detail page and present the target conference query result on the conference information detail page.

Step 211: In response to detecting a selecting operation on a hit subtitle sentence in the target conference query result presented on the conference information detail page, the terminal device plays a conference audio and video corresponding to the target conference query result on the conference information detail page from the subtitle sentence time corresponding to the selected subtitle sentence.

Here, the user selects the subtitle sentence in the conference information detail page, and then plays the conference audio and video corresponding to the target conference query result on the conference information detail page from the subtitle sentence time corresponding to the selected subtitle sentence. In practice, the terminal device may generate an audio and video playback request based on the conference identifier and subtitle sentence time corresponding to the subtitle sentence selected by the user in the conference information detail page, and send the audio and video playback request to the server, to implement subsequent playback of the conference audio and video corresponding to the selected subtitle sentence from the subtitle sentence time corresponding to the selected subtitle sentence.

Through the optional implementation (4), the conference audio and video may be accurately positioned to the selected subtitle sentence on the conference information detail page in the terminal device and played, thereby further improving the efficiency of user conference information query.

Figure 2B:
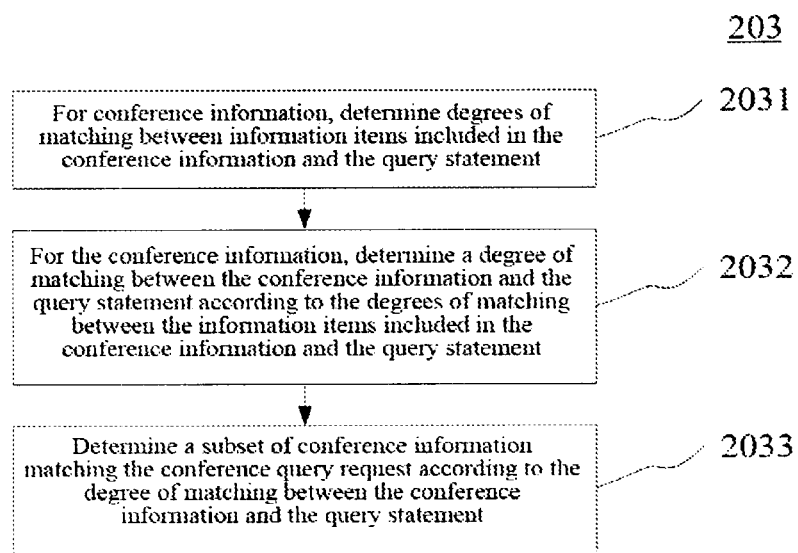
FIG. 2B is a decomposition flowchart of an embodiment of step 203 according to the present disclosure.

Optional implementation (5): The conference information may include at least one information item, and the at least one information item may include the conference identifier, the sequence of subtitle sentences, and the sequence of subtitle sentence time; and in step 203, the server queries conference information matching the conference query request in response to receiving the conference query request sent by the terminal device, to obtain a subset of conference information, which may include step 2031 to step 2033 as shown in FIG. 2B:

Step 2031: For conference information, determine degrees of matching between information items included in the conference information and the query statement.

Here, the degrees of matching between the information items included in the conference information and the query statement may be determined by using various methods for calculating similarities between texts. For example, a similarity between two texts may be obtained by dividing the number of identical characters included in the two texts by the larger length of the two texts, or first determining semantic vectors of the two texts and then calculating a similarity (for example, a cosine similarity) between the semantic vectors of the two texts.

Step 2032: For the conference information, determine a degree of matching between the conference information and the query statement according to the degrees of matching between the information items included in the conference information and the query statement.

For example, a maximum, minimum, or average value of the degrees of matching between the information items included in the conference information and the query statement may be determined as the degree of matching between the conference information and the query statement.

Optionally, for the conference information, the degrees of matching between the information items included in the conference information and the query statement are weighted and summed according to preset weights of the information items included in the conference information, and the weighted sum result may be determined as the degree of matching between the conference information and the query statement. According to this optional implementation, different weights may be preset for different content of the information items included in the conference information, to reflect the importance of content of different information items included in different conference information.

Step 2033: Determine a subset of conference information matching the conference query request according to the degree of matching between the conference information and the query statement.

Here, the subset of conference information matching the conference query request may be determined in various ways according to the degree of matching between the conference information and the query statement. For example, degrees of matching between conference information and the query statement may be sorted, and the subset of conference information may be generated by using a preset number of pieces of conference information with the highest degree of matching. For example, the conference information at a degree of matching the query statement greater than a preset matching threshold is added to the subset of conference information.

Through the foregoing optional implementation (5), the information items of the conference information may be globally or partially queried.

Optional implementation (6): Step 201 may alternatively be performed as follows:

In response to detecting a conference query operation, the terminal device first obtains a current language class identifier of the terminal device, and then generates a conference query request based on a query statement corresponding to the conference query operation and the current language class identifier. That is, the conference query request may also include the current language class identifier in addition to the query statement corresponding to the conference query operation.

Here, the current language class identifier is used to represent a current language class, for example, the current language class may be Chinese, English, or Japanese. In practice, the current language class may be modified or set in various ways. For example, a function of setting the current language class may be provided in an audio and video conference application or web page of the terminal device to enable the user to set the current language class. Optionally, the terminal device may present a language class setting interface in response to detecting a preset language class setting operation, and determine a language class identifier input by the user in the language class setting interface as the current language class identifier.

Through the foregoing optional implementation (6), the conference query request sent by the terminal device to the server includes the current language class identifier, which may improve retrieval efficiency in subsequent retrieval of the server, thereby improving the speed of providing, by the terminal device, the user with conference information that meets a query requirement.

Optional implementation (7): Based on the foregoing optional implementation (6), the conference query request received by the server from the terminal device may further include the current language class identifier set by the user in the terminal device to represent the current language class, and the conference subtitle in the conference information may further include a sequence of subtitle sentence language class identifiers in addition to the sequence of subtitle sentences and the sequence of subtitle sentence time. The sequence of subtitle sentence language class identifiers may be a sequence of language class identifiers corresponding to the sequence of subtitle sentences and used to represent a language class of each subtitle sentence in the sequence of subtitle sentences. Further, the conference subtitle in the conference information not only records each subtitle sentence and the corresponding subtitle starting time, but also records a language type used for each subtitle sentence.

Optional implementation (8): Based on the foregoing optional implementations (5) and (7), in step 2031, for conference information, determining degrees of matching between information items included in the conference information and the query statement may include the following operations:

for the conference information, determining a degree of matching between the conference subtitle in the conference information and the query statement according to a degree of matching between a target language class subtitle sentence in the conference information and the query statement, where the target language class subtitle sentence is a subtitle sentence, the corresponding subtitle sentence language class identifier of which is the current language class identifier, in the sequence of subtitle sentences in the conference subtitle of the conference information.

That is, in the process of determining the degrees of matching between the information items included in the conference information and the query statement, the degree of matching between the conference subtitle included in the conference information and the query statement needs to be determined. Here, in the process of determining the degree of matching between the conference subtitle included in the conference information and the query statement, all the subtitle sentences in the sequence of subtitle sentences of the conference subtitle do not need to be considered, but only the subtitle sentence, the corresponding subtitle language of which is the same as the current language class identifier in the conference query request, needs to be considered, which reduces computations, improves the computation speed in step 2031, and thus improves the execution speed of the server in step 203, reduces the time for the terminal device to obtain the conference query results, and improves user experience. In addition, the conference query results include subtitle sentences of the current language class set by the user, which meets user's needs and further enhances the user experience.

Optional implementation (9): Based on the foregoing optional implementations (5) and (6), the conference query request received by the server from the terminal device may further include the current language class identifier, and the conference information may further include phonetic annotation information of a preset number of language classes corresponding to a basic text information item in at least one basic text information item. For example, the basic text information item may be a participant name, and the basic text information item, that is, the participant name, correspondingly has phonetic annotation information of two language classes, such as Chinese pinyin and Japanese romaji. In step 2031, for conference information, determining degrees of matching between information items included in the conference information and the query statement may include the following operations:

for the conference information, determining a degree of matching between the basic text information item in the conference information and the query statement according to a degree of matching between the query statement and the basic text information item of the conference information and/or the phonetic annotation information of the language class indicated by the current language class identifier corresponding to the basic text information item.

Optionally, the conference information further includes at least one of the following information items: conference title information and conference comment information; and the conference information includes at least one of the following basic text information items: a participant name and the sequence of subtitle sentences.

That is, in the process of determining the degrees of matching between the information items included in the conference information and the query statement, because the conference information further includes at least one basic text information item, a degree of matching between the at least one basic text information item included in the conference information and the query statement also needs to be determined. Here, in the process of determining the degree of matching between the at least one basic text information item included in the conference information and the query statement, the basic text information item itself and/or the phonetic annotation information corresponding to the basic text information item may be considered, which facilitates the user to query the conference by using the phonetic annotation information, and may also facilitate the user to query the basic text information item by using the phonetic annotation information of multiple language classes, thereby further improving user experience.

Optional Implementation (10)

The conference information in the server may be generated through the following steps:

First, for a sequence of to-be-stored subtitle sentences corresponding to a to-be-stored conference identifier and a corresponding sequence of to-be-stored subtitle sentence time, each to-be-stored subtitle sentence is segmented according to a segmentation method corresponding to the language class of the to-be-stored subtitle sentence, to obtain a sequence of subtitle sentence segments corresponding to the to-be-stored subtitle sentence.

In practice, for example, a plurality of terminal devices participate in an audio and video conference through a server, each terminal device may collect audios and videos of the current environment in real time and send the audios and videos to the server, and the server may send the audio and video data received from each terminal device to other terminal devices participating in the audio and video conference. After the conference, the server may synthesize the audios and videos collected by all the terminal devices into an audio and video and store the audio and video corresponding to a conference identifier of the audio and video conference. Next, the server may perform automatic voice recognition on the stored audio and video data to obtain a conference subtitle text corresponding to the conference identifier, then segment the conference subtitle text into sentences in various ways, and generate subtitle time corresponding to each subtitle sentence, so as to obtain a sequence of conference subtitle sentences and a corresponding sequence of subtitle sentence time. For the convenience of query, the server may use the conference identifier of the audio and video conference, the sequence of subtitle sentences, and the sequence of subtitle sentence time as a to-be-stored conference identifier, a sequence of to-be-stored subtitle sentences, and a sequence of to-be-stored subtitle sentence time respectively, and for each to-be-stored subtitle sentence in the sequence of to-be-stored subtitle sentences, the server may segment the to-be-stored subtitle sentence according to a segmentation method corresponding to the language class of the to-be-stored subtitle sentence, to obtain a sequence of subtitle sentence segments corresponding to the to-be-stored subtitle sentence.

In practice, because expressions of texts of different language types are different, the segmentation methods may also be different. Therefore, the to-be-stored subtitle sentences may be segmented according to the segmentation processing methods corresponding to different language classes, to obtain corresponding sequences of subtitle sentence segments. For example, the to-be-stored subtitle sentences in Chinese may be segmented by using a third-party Chinese segmentation library jieba in a Python basic library. The to-be-stored subtitle sentences in Japanese may be segmented by using mecab (a Japanese segmentation system developed by Taku Kudo from Nara Institute of Science and Technology). The to-be-stored subtitle sentences in English may be segmented based on spaces.

A to-be-stored subtitle sentence "The theme of today's conference is to conduct a year-end summary" is used as an example. A sequence of subtitle sentence segments "The theme/of/today/'s/conference/is/to conduct/a year/-end/ summary/" may be obtained by segmentation.

Following the foregoing operations, each subtitle sentence in the sequence of to-be-stored subtitle sentences may be segmented in a targeted manner, thereby improving the accuracy of segmentation.

Next, the sequence of to-be-stored subtitle sentences is generated by using the sequence of subtitle sentence segments corresponding to each to-be-stored subtitle sentence in order of appearance of the corresponding to-be-stored subtitle sentences in the sequence of to-be-stored subtitle sentences. Here, an element in the sequence of to-be-stored subtitle sentences is the sequence of subtitle sentence segments of the to-be-stored subtitle sentence corresponding to the element.

Then, a sequence of to-be-stored subtitle language class identifiers is generated by using a language class identifier corresponding to each to-be-stored subtitle sentence in order of appearance of the corresponding to-be-stored subtitle sentences in the sequence of to-be-stored subtitle sentences.

Finally, the conference information is generated by using the to-be-stored conference identifier, the sequence of to-be-stored subtitle sentences, the sequence of to-be-stored subtitle sentence time, and the sequence of to-be-stored subtitle language class identifiers.

That is, the conference subtitle in the conference information stored according to the optional implementation (10) includes a sequence of subtitle sentence segments, a language class identifier, and corresponding subtitle starting time of each subtitle sentence. The sequence of subtitle sentence segments stored here is more convenient for query and retrieval than the stored subtitle sentence to improve query and retrieval speed.

Optional implementation (11): Based on the optional implementation (10), the conference information storage request may further include at least one of the following: a conference title, participant information, and conference comments; and the foregoing operation of generating conference information by using the to-be-stored conference identifier, the sequence of to-be-stored subtitle sentences, the sequence of to-be-stored subtitle sentence time, and the sequence of to-be-stored subtitle language class identifiers may be performed as follows: generating the conference information by using the to-be-stored conference identifier, the sequence of to-be-stored subtitle sentences, the sequence of to-be-stored subtitle sentence time, the sequence of to-be-stored subtitle language class identifiers, and at least one of the following: conference title, participant information, and conference comments. The conference information stored according to the optional implementation (11) may further include the conference title, participant information, or conference comments, which enriches the stored conference information content.

Optional implementation (12): Based on the optional implementation (10) or (11), in step 205, the server generates conference query results by using each hit subtitle sentence corresponding to the conference information in the subset of conference information and corresponding subtitle sentence time, to obtain a set of conference query results, which may be performed as follows:

First, for the conference information in the subset of conference information, information items matching the query statement among the information items included in the conference information are marked as to-be-highlighted content of the conference information.

As described in the optional implementation (10), the conference subtitle of the conference information further stores the sequence of subtitle sentence segments, so parts of the subtitle sentences that match the query statement may be marked more conveniently to facilitate highlighting on the terminal device. Here, the server may alternatively mark other information items in the conference information as to-be-highlighted content.

Second, the conference query results are generated by using each hit subtitle sentence corresponding to the conference information in the subset of conference information, the corresponding subtitle sentence time, and the to-be-highlighted content.

That is, the conference query results generated based on the optional implementation (12) further include the to-be-highlighted content.

Optional implementation (13): Based on the optional implementation (12), in step 207, the terminal device presents each conference query result in response to receiving the set of conference query results that is sent by the server in response to the conference query request, which may be performed as follows: presenting the to-be-highlighted content in each conference query result in a preset highlighting manner, and presenting non-to-be-highlighted content in each conference query result in a preset conventional display manner. The preset highlighting manner may be various preset presentation manners that differ from the preset conventional display manner. For example, the preset highlighting manner may fill the to-be-highlighted content with a yellow background color, while the preset regular display manner does not fill with the yellow background color, but fills with white, for example.

Based on the optional implementation (13), the part matching the query statement may be separately displayed on the terminal device to distinguish from other parts.

According to the conference information query system provided in the foregoing embodiment of the present disclosure, a conference query operation is performed in a terminal device to trigger a conference query request, and conference query results are obtained through a server and presented, to achieve the following technical effects including but not limited to:

First, the server queries conference information related to the conference query request and generates a subset of conference information, then determines sentences matching a query statement among subtitle sentences of a conference subtitle in the subset of conference information as hit subtitle sentences, and returns the hit subtitle sentences and subtitle sentence time to the terminal device together. In this case, when the terminal device presents the conference information related to the query statement, the terminal device may present which subtitle sentences in specific conference content are hit by the specific query statement, and specific time of appearance of the hit subtitle sentences, rather than just presenting which conferences may match the query statement, thereby enriching the presented conference information content and implementing targeted presentation of conference content and corresponding time that match the query statement.

Second, through the optional implementations (3) and (4), the user may select a subtitle sentence from the presented subtitle sentences on the global conference information page and the conference information detail page, and then directly play a conference audio and video corresponding to the subtitle sentence on the terminal device, which achieves precise audio and video positioning and further improves the efficiency of user query of conference information.

Third, through the optional implementations (6) and (7), the conference query request sent by the terminal device to the server includes the current language class identifier, and the server may perform targeted query only in the subtitle sentences of the corresponding language class in the sequence of conference subtitle sentences of the conference information, without querying all the subtitle sentences, thereby improving query efficiency and improving the speed and accuracy of providing, by the terminal device, the user with conference information that meets query requirements. In addition, the conference query results include subtitle sentences of the current language class set by the user, which meets user's needs and further enhances user experience.

Fourth, through the optional implementation (9), in the process of determining the degree of matching between the at least one basic text information item included in the conference information and the query statement, the basic text information item itself and/or the phonetic annotation information corresponding to the basic text information item may be considered, which facilitates the user to query the conference by using the phonetic annotation information, and may also facilitate the user to query the basic text information item by using the phonetic annotation information of multiple language classes, thereby further improving the user experience.

Fifth, through the optional implementation (10), the conference subtitle in the stored conference information includes a sequence of subtitle sentence segments, a language class identifier, and corresponding subtitle starting time of each subtitle sentence, which is more convenient for query and retrieval than storing the subtitle sentences and improves query and retrieval speed.

Sixth, through the optional implementation (11), the stored conference information may further include the conference title, participant information, or conference comments, which enriches the stored conference information content.

Seventh, through the optional implementation (12), the conference query results generated by the server further include to-be-highlighted content.

Eighth, through the optional implementation (13), the part matching the query statement may be separately displayed on the terminal device to distinguish from other parts.

Figure 3:
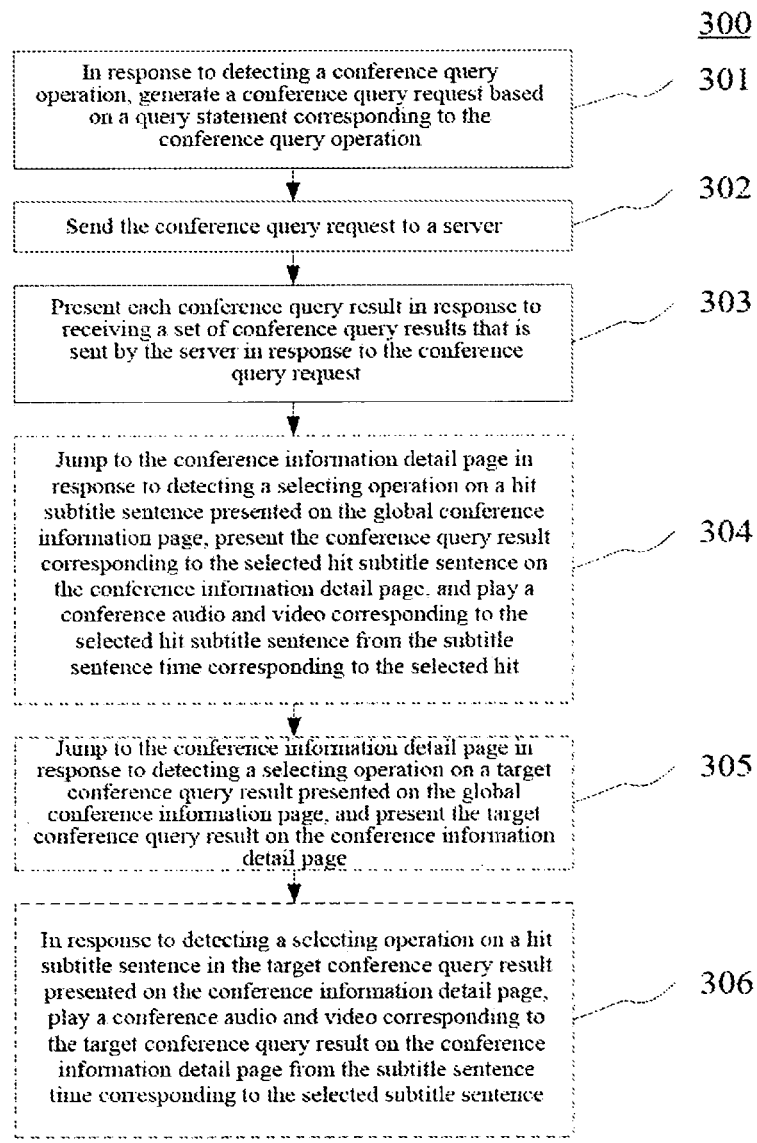
FIG. 3 is a flowchart of an embodiment of a conference information query method applied to a terminal device according to the present disclosure.

Continue to refer to FIG. 3, which illustrates a process 300 of an embodiment of a conference information query method according to the present disclosure. The conference information query method, applied to a terminal device, includes the following steps:

Step 301: In response to detecting a conference query operation, generate a conference query request based on a query statement corresponding to the conference query operation.

Step 302: Send the conference query request to a server.

Step 303: Present each conference query result in response to receiving a set of conference query results that is sent by the server in response to the conference query request.

In this embodiment, the specific operations and resulting technical effects of steps 301, 302, and 303 are basically the same as those of steps 201, 202, and 207 in the embodiment shown in FIG. 2, and will not be repeated here.

In some optional implementations, step 301 may be performed as follows:

presenting a set of conference information corresponding to a current login user identifier on a global conference information page, and generating the conference query request based on the query statement in response to detecting the query statement input by a user on the global conference information page.

Here, the specific operations and resulting technical effects of the optional implementation of step 301 are basically the same as those described in the optional implementation (1) shown in FIG. 2, and will not be repeated here.

In some optional implementations, step 303 may be performed as follows:

presenting each conference query result on the global conference information page; or jumping to a conference information detail page to present each conference query result.

Here, the specific operations and resulting technical effects of the optional implementation of step 303 are basically the same as those described in the optional implementation (2) shown in FIG. 2, and will not be repeated here.

In some optional implementations, the foregoing process 300 may further include step 304 below:

Step 304: Jump to the conference information detail page in response to detecting a selecting operation on a hit subtitle sentence presented on the global conference information page, present the conference query result corresponding to the selected hit subtitle sentence on the conference information detail page, and play a conference audio and video corresponding to the selected hit subtitle sentence from the subtitle sentence time corresponding to the selected hit subtitle sentence.

Here, the specific operations and resulting technical effects of step 304 are basically the same as those of step 208 described in the optional implementation (3) shown in FIG. 2, and will not be repeated here.

In some optional implementations, the foregoing process 300 may further include step 305 and step 306 below:

Step 305: Jump to the conference information detail page in response to detecting a selecting operation on a target conference query result presented on the global conference information page, and present the target conference query result on the conference information detail page.

Step 306: In response to detecting a selecting operation on a hit subtitle sentence in the target conference query result presented on the conference information detail page, play a conference audio and video corresponding to the target conference query result on the conference information detail page from the subtitle sentence time corresponding to the selected subtitle sentence.

Here, the specific operations and resulting technical effects of step 305 and step 306 are basically the same as those of step 210 and step 211 described in the optional implementation (4) shown in FIG. 2, and will not be repeated here.

In some optional implementations, generating a conference query request based on a query statement corresponding to the conference query operation may include: obtaining a current language class identifier of the terminal device, and generating the conference query request based on the query statement corresponding to the conference query operation, and the current language class identifier. Here, the specific operations and resulting technical effects of the foregoing optional implementations of generating a conference query request based on a query statement corresponding to the conference query operation are basically the same as those described in the optional implementation (6) shown in FIG. 2, and will not be repeated here.

In some optional implementations, the foregoing process 300 may further include the following operations: presenting a language class setting interface in response to detecting a preset language class setting operation, and determining a language class identifier input by the user in the language class setting interface as the current language class identifier. Here, the specific operations and resulting technical effects of the optional implementations are basically the same as those described in the optional implementation (6) shown in FIG. 2, and will not be repeated here.

In some optional implementations, the conference query results may further include to-be-highlighted content; and step 303 may alternatively be performed as follows: presenting the to-be-highlighted content in each conference query result in a preset highlighting manner, and presenting non-to-be-highlighted content in each conference query result in a preset conventional display manner. Here, the specific operations and resulting technical effects of the foregoing optional implementations of step 303 are basically the same as those described in the optional implementation (13) shown in FIG. 2, and will not be repeated here.

According to the method provided in the foregoing embodiment of the present disclosure, a conference query request is initiated on the terminal device, and conference query results sent in response to the conference query request and received from a server are presented, thereby achieving the presentation of conference query results on the terminal device.

Figure 4:
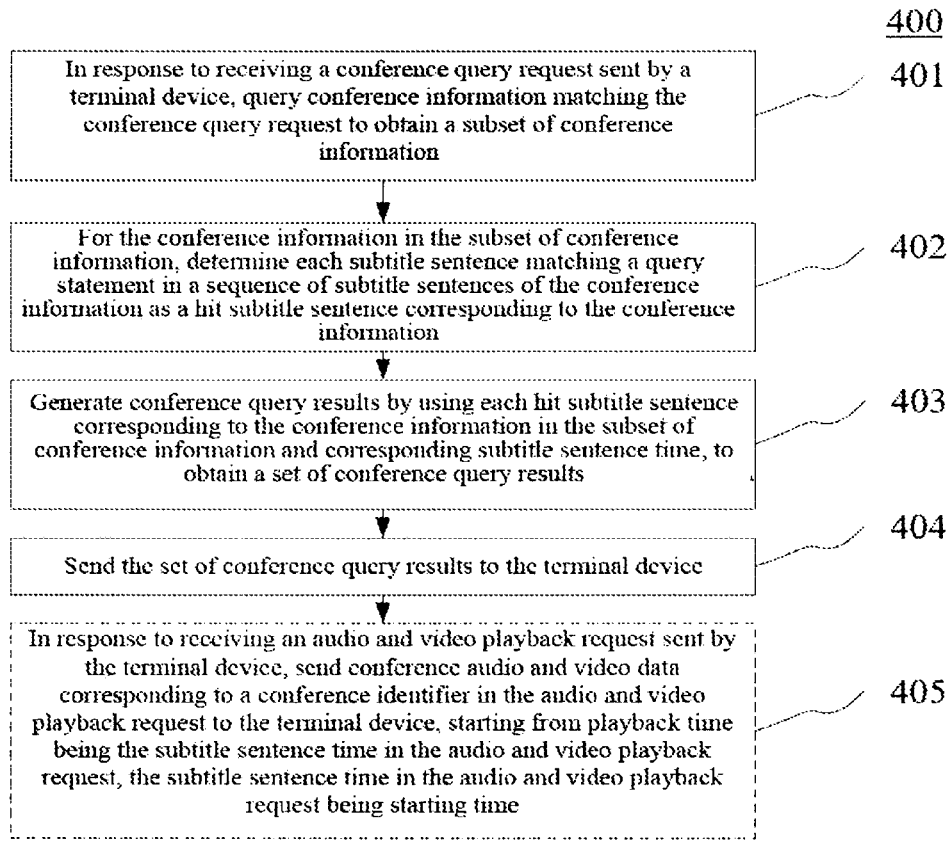
FIG. 4 is a flowchart of an embodiment of a conference information query method applied to a server according to the present disclosure.

Continue to refer to FIG. 4, which illustrates a process 400 of an embodiment of a conference information query method according to the present disclosure. The conference information query method, applied to a server, includes the following steps:

Step 401: In response to receiving a conference query request sent by a terminal device, query conference information matching the conference query request to obtain a subset of conference information.

Step 402: For the conference information in the subset of conference information, determine each subtitle sentence matching a query statement in a sequence of subtitle sentences of the conference information as a hit subtitle sentence corresponding to the conference information.

Step 403: Generate conference query results by using each hit subtitle sentence corresponding to the conference information in the subset of conference information and corresponding subtitle sentence time, to obtain a set of conference query results.

Step 404: Send the set of conference query results to the terminal device.

In this embodiment, the specific operations and resulting technical effects of steps 401, 402, 403, and 404 are basically the same as those of steps 203, 204, 205, and 206 in the embodiment shown in FIG. 2, and will not be repeated here.

In some optional implementations, the foregoing process 400 may further include step 405 below:

Step 405: In response to receiving an audio and video playback request sent by the terminal device, send conference audio and video data corresponding to a conference identifier in the audio and video playback request to the terminal device, starting from playback time being the subtitle sentence time in the audio and video playback request, the subtitle sentence time in the audio and video playback request being starting time.

Here, the specific operations and resulting technical effects of step 405 are basically the same as those of step 209 in the embodiment shown in FIG. 2, and will not be repeated here.

In some optional implementations, the conference information may include at least one information item, and the at least one information item may include the conference identifier, the sequence of subtitle sentences, and the sequence of subtitle sentence time; and step 401 may be performed as follows: for conference information, determining degrees of matching between the information items included in the conference information and the query statement, and determining a degree of matching between the conference information and the query statement according to the degrees of matching between the information items included in the conference information and the query statement; and determining the subset of conference information matching the conference query request according to the degree of matching between the conference information and the query statement.

In some optional implementations, the determining a degree of matching between the conference information and the query statement according to the degrees of matching between the information items included in the conference information and the query statement may be performed as follows: for the conference information, weighting and summing the degrees of matching between the information items included in the conference information and the query statement according to preset weights of the information items included in the conference information, and determining the weighted sum result as the degree of matching between the conference information and the query statement.

Here, the specific operations and resulting technical effects of the foregoing optional implementations of step 401 are basically the same as those of steps 2031, 2032, and 2033 in the optional implementation (5) shown in FIG. 2, and will not be repeated here. In some optional implementations, the conference query request may further include a current language class identifier set by the user in the terminal device to represent a current language class, and the conference subtitle may further include a sequence of subtitle sentence language class identifiers consisting of subtitle sentence language class identifiers used to represent a subtitle sentence language class corresponding to each subtitle sentence in the sequence of subtitle sentences included in the conference subtitle; and for conference information, determining degrees of matching between the information items included in the conference information and the query statement may be performed as follows:

for the conference information, determining a degree of matching between the conference subtitle in the conference information and the query statement according to a degree of matching between a target language class subtitle sentence in the conference information and the query statement, where the target language class subtitle sentence is a subtitle sentence, the corresponding subtitle sentence language class identifier of which is the current language class identifier, in the sequence of subtitle sentences in the conference subtitle of the conference information.

Here, the specific operations and resulting technical effects of the optional implementations of, for conference information, determining degrees of matching between the information items included in the conference information and the query statement, are basically the same as those described in the optional implementation (8) shown in FIG. 2, and will not be repeated here.

In some optional implementations, the conference information may further include phonetic annotation information of a preset number of language classes corresponding to a basic text information item in at least one basic text information item; the conference query request may further include a current language class identifier set by the user in the terminal device to represent a current language class; and for conference information, determining degrees of matching between the information items included in the conference information and the query statement may be alternatively performed as follows:

for the conference information, determining a degree of matching between the basic text information item in the conference information and the query statement according to a degree of matching between the query statement and the basic text information item of the conference information and/or the phonetic annotation information of the language class indicated by the current language class identifier corresponding to the basic text information item.

Here, the specific operations and resulting technical effects of the optional implementations of, for conference information, determining degrees of matching between the information items included in the conference information and the query statement, are basically the same as those described in the optional implementation (9) shown in FIG. 2, and will not be repeated here.

In some optional implementations, the conference information may further include at least one of the following information items: conference title information and conference comment information; and the conference information may include at least one of the following basic text information items: a participant name and the sequence of subtitle sentences.

In some optional implementations, the conference information may be generated through the following steps:

for a sequence of to-be-stored subtitle sentences corresponding to a to-be-stored conference identifier and a corresponding sequence of to-be-stored subtitle sentence time, segmenting each to-be-stored subtitle sentence according to a segmentation method corresponding to the language class of the to-be-stored subtitle sentence, to obtain a sequence of subtitle sentence segments corresponding to the to-be-stored subtitle sentence;

generating the sequence of to-be-stored subtitle sentences by using the sequence of subtitle sentence segments corresponding to each to-be-stored subtitle sentence in order of appearance of the corresponding to-be-stored subtitle sentences in the sequence of to-be-stored subtitle sentences, where an element in the sequence of to-be-stored subtitle sentences is the sequence of subtitle sentence segments of the to-be-stored subtitle sentence corresponding to the element;

generating a sequence of to-be-stored subtitle language class identifiers by using a language class identifier corresponding to each to-be-stored subtitle sentence in order of appearance of the corresponding to-be-stored subtitle sentences in the sequence of to-be-stored subtitle sentences; and generating the conference information by using the to-be-stored conference identifier, the sequence of to-be-stored subtitle sentences, the sequence of to-be-stored subtitle sentence time, and the sequence of to-be-stored subtitle language class identifiers, and storing the conference information.

In some optional implementations, the generating conference query results by using a conference identifier corresponding to the conference information in the subset of conference information, each hit subtitle sentence, and corresponding subtitle sentence time, to obtain a set of conference query results may include: for the conference information in the subset of conference information, marking information items matching the query statement among the information items included in the conference information as to-be-highlighted content of the conference information; and generating the conference query results by using each hit subtitle sentence corresponding to the conference information in the subset of conference information, the corresponding subtitle sentence time, and the to-be-highlighted content.

Here, the specific operations and resulting technical effects of the optional implementations of generating the conference information are basically the same as those described in the optional implementation (9) shown in FIG. 2, and will not be repeated here.

According to the conference information query method provided in the foregoing embodiment of the present disclosure, a conference query request sent by a terminal device is performed on the server, conference query results are fed back to the terminal device, and hit subtitle sentences matching a query statement and corresponding subtitle sentence time are returned together in a query process, which may enrich the conference information content presented by the terminal device and achieve accurate positioning of retrieved conference information by a user.

Figure 5:
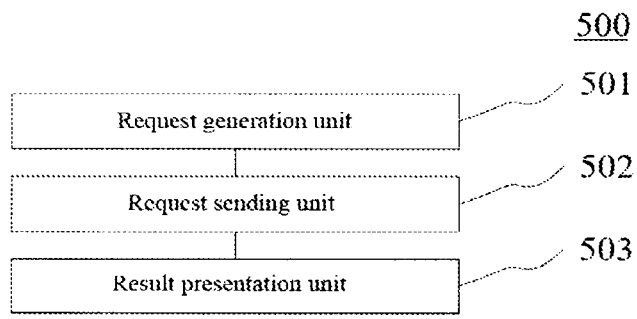
FIG. 5 is a schematic structural diagram of an embodiment of a conference information query apparatus applied to a terminal device according to the present disclosure.

Further refer to FIG. 5. As an implementation of the methods shown in the foregoing figures, the present disclosure provides an embodiment of a conference information query apparatus. The embodiment of the apparatus corresponds to the embodiment of the method shown in FIG. 3, and the apparatus may be applied to various terminal devices.

As shown in FIG. 5, the conference information query apparatus 500 in this embodiment includes: a request generation unit 501, a request sending unit 502, and a result presentation unit 503. The request generation unit 501 is configured to generate, in response to detecting a conference query operation, a conference query request based on a query statement corresponding to the conference query operation; the request sending unit 502 is configured to send the conference query request to a server; and the result presentation unit 503 is configured to present each conference query result in response to receiving a set of conference query results that is sent by the server in response to the conference query request, where the conference query results include a set of hit subtitle sentences and subtitle sentence time corresponding to each hit subtitle sentence.

In this embodiment, the specific processing and resulting technical effects of the request generation unit 501, the request sending unit 502, and the result presentation unit 503 of the conference information query apparatus 500 may be referred to the related descriptions of steps 301, 302, and 303 in the corresponding embodiment of FIG. 3, and will not be repeated here.

In some optional implementations, the request generation unit 501 may be further configured to: present a set of conference information corresponding to a current login user identifier on a global conference information page; and generate the conference query request based on the query statement in response to detecting the query statement input by a user on the global conference information page.

In some optional implementations, the result presentation unit 503 may be further configured to: present each conference query result on the global conference information page; or jump to a conference information detail page to present each conference query result.

In some optional implementations, the apparatus 500 may further include: a global page selection and detail page playback unit (not shown), configured to jump to the conference information detail page in response to detecting a selecting operation on a hit subtitle sentence presented on the global conference information page, present the conference query result corresponding to the selected hit subtitle sentence on the conference information detail page, and play a conference audio and video corresponding to the selected hit subtitle sentence from the subtitle sentence time corresponding to the selected hit subtitle sentence.

In some optional implementations, the apparatus 500 may further include: a global page selection and detail page presentation unit (not shown), configured to jump to the conference information detail page in response to detecting a selecting operation on a target conference query result presented on the global conference information page, and present the target conference query result on the conference information detail page.

In some optional implementations, the apparatus 500 may further include: a detail page selection and playback unit (not shown), configured to play, in response to detecting a selecting operation on a hit subtitle sentence in the target conference query result presented on the conference information detail page, a conference audio and video corresponding to the target conference query result on the conference information detail page from the subtitle sentence time corresponding to the selected subtitle sentence.

In some optional implementations, the request generation unit 501 may be further configured to: obtain a current language class identifier of the terminal device, and generate the conference query request based on the query statement corresponding to the conference query operation and the current language class identifier.

In some optional implementations, the apparatus 500 may further include: a language class determination unit (not shown), configured to present a language class setting interface in response to detecting a preset language class setting operation, and determine a language class identifier input by the user in the language class setting interface as the current language class identifier.

In some optional implementations, the conference query results may further include to-be-highlighted content; and the result presentation unit 503 may be further configured to: present the to-be-highlighted content in each conference query result in a preset highlighting manner, and present non-to-be-highlighted content in each conference query result in a preset conventional display manner.

It should be noted that the implementation details and technical effects of each unit in the conference information query apparatus provided in the embodiment of the present disclosures may be referred to the descriptions of other embodiments in the present disclosure, and will not be repeated here.

Figure 6:
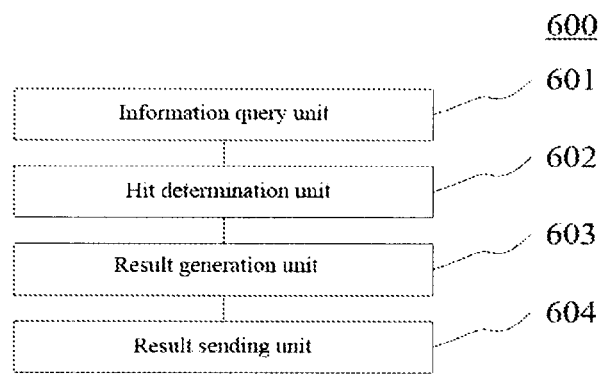
FIG. 6 is a schematic structural diagram of an embodiment of a conference information query apparatus applied to a server according to the present disclosure.

Further refer to FIG. 6. As an implementation of the methods shown in the foregoing figures, the present disclosure provides an embodiment of a conference information query apparatus. The embodiment of the apparatus corresponds to the embodiment of the method shown in FIG. 4, and the apparatus may be applied to various electronic devices.

As shown in FIG. 6, the conference information query apparatus 600 in this embodiment includes: an information query unit 601, a hit determination unit 602, a result generation unit 603, and a result sending unit 604. The information query unit 601 is configured to query, in response to receiving a conference query request sent by a terminal device, conference information matching the conference query request, to obtain a subset of conference information, where the conference information includes a conference identifier and a conference subtitle, and the conference subtitle includes a sequence of subtitle sentences and a corresponding sequence of subtitle sentence time that sequentially consists of subtitle sentence time corresponding to each subtitle sentence in the sequence of subtitle sentences; the hit determination unit 602 is configured to determine, for the conference information in the subset of conference information, each subtitle sentence matching a query statement in the sequence of subtitle sentences of the conference information as a hit subtitle sentence corresponding to the conference information; the result generation unit 603 is configured to generate conference query results by using each hit subtitle sentence corresponding to the conference information in the subset of conference information and corresponding subtitle sentence time, to obtain a set of conference query results; and the result sending unit 604 is configured to send the set of conference query results to the terminal device.

In this embodiment, the specific processing and resulting technical effects of the information query unit 601, the hit determination unit 602, the result generation unit 603, and the result sending unit 604 of the conference information query apparatus 600 may be referred to the related descriptions of steps 401, 402, 403, and 404 in the corresponding embodiment of FIG. 4, and will not be repeated here.

In some optional implementations, the apparatus 600 may further include: an audio and video sending unit (not shown), configured to send, in response to receiving an audio and video playback request sent by the terminal device, conference audio and video data corresponding to a conference identifier in the audio and video playback request to the terminal device, starting from the subtitle sentence time in the audio and video playback request, where the audio and video playback request is triggered by the terminal device in response to a user's selecting operation on the conference query result in the set of presented conference query results.

In some optional implementations, the conference information may include at least one information item, and the at least one information item may include the conference identifier, the sequence of subtitle sentences, and the sequence of subtitle sentence time; and the information query unit 601 may be further configured to: for conference information, determine degrees of matching between the information items included in the conference information and the query statement, and determine a degree of matching between the conference information and the query statement according to the degrees of matching between the information items included in the conference information and the query statement; and determine the subset of conference information matching the conference query request according to the degree of matching between the conference information and the query statement.

In some optional implementations, the conference query request may further include a current language class identifier set by the user in the terminal device to represent a current language class, and the conference subtitle may further include a sequence of subtitle sentence language class identifiers consisting of subtitle sentence language class identifiers used to represent a subtitle sentence language class corresponding to each subtitle sentence in the sequence of subtitle sentences included in the conference subtitle; and for conference information, determining degrees of matching between the information items included in the conference information and the query statement may include: for the conference information, determining a degree of matching between the conference subtitle in the conference information and the query statement according to a degree of matching between a target language class subtitle sentence in the conference information and the query statement, where the target language class subtitle sentence is a subtitle sentence, the corresponding subtitle sentence language class identifier of which is the current language class identifier, in the sequence of subtitle sentences in the conference subtitle of the conference information.

In some optional implementations, the conference information may further include phonetic annotation information of a preset number of language classes corresponding to a basic text information item in at least one basic text information item; the conference query request may further include a current language class identifier set by the user in the terminal device to represent a current language class; and for conference information, determining degrees of matching between the information items included in the conference information and the query statement may include: for the conference information, determining a degree of matching between the basic text information item in the conference information and the query statement according to a degree of matching between the query statement and the basic text information item of the conference information and/or the phonetic annotation information of the language class indicated by the current language class identifier corresponding to the basic text information item.

In some optional implementations, the conference information may further include at least one of the following information items: conference title information and conference comment information; and the conference information may include at least one of the following basic text information items: a participant name and the sequence of subtitle sentences.

In some optional implementations, the determining a degree of matching between the conference information and the query statement according to the degrees of matching between the information items included in the conference information and the query statement may include: for the conference information, weighting and summing the degrees of matching between the information items included in the conference information and the query statement according to preset weights of the information items included in the conference information, and determining the weighted sum result as the degree of matching between the conference information and the query statement.

In some optional implementations, the conference information may be generated through the following steps: for a sequence of to-be-stored subtitle sentences corresponding to a to-be-stored conference identifier and a corresponding sequence of to-be-stored subtitle sentence time, segmenting each to-be-stored subtitle sentence according to a segmentation method corresponding to the language class of the to-be-stored subtitle sentence, to obtain a sequence of subtitle sentence segments corresponding to the to-be-stored subtitle sentence; generating the sequence of to-be-stored subtitle sentences by using the sequence of subtitle sentence segments corresponding to each to-be-stored subtitle sentence in order of appearance of the corresponding to-be-stored subtitle sentences in the sequence of to-be-stored subtitle sentences, where an element in the sequence of to-be-stored subtitle sentences is the sequence of subtitle sentence segments of the to-be-stored subtitle sentence corresponding to the element; generating a sequence of to-be-stored subtitle language class identifiers by using a language class identifier corresponding to each to-be-stored subtitle sentence in order of appearance of the corresponding to-be-stored subtitle sentences in the sequence of to-be-stored subtitle sentences; and generating the conference information by using the to-be-stored conference identifier, the sequence of to-be-stored subtitle sentences, the sequence of to-be-stored subtitle sentence time, and the sequence of to-be-stored subtitle language class identifiers, and storing the conference information.

In some optional implementations, the generating conference query results by using a conference identifier corresponding to the conference information in the subset of conference information, each hit subtitle sentence, and corresponding subtitle sentence time, to obtain a set of conference query results may include: for the conference information in the subset of conference information, marking information items matching the query statement among the information items included in the conference information as to-be-highlighted content of the conference information; and generating the conference query results by using each hit subtitle sentence corresponding to the conference information in the subset of conference information, the corresponding subtitle sentence time, and the to-be-highlighted content.

It should be noted that the implementation details and technical effects of the units in the conference information inquiry device provided by embodiments of the present disclosure can be referred to the descriptions of other embodiments in the present disclosure and will not be repeated here.

Figure 7:
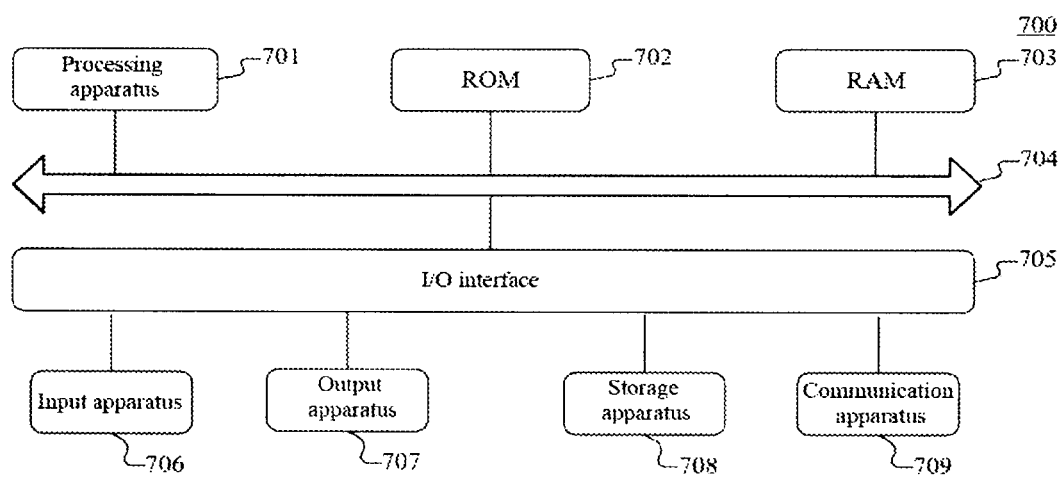
FIG. 7 is a schematic structural diagram of a computer system suitable for implementing a terminal device or a server according to the embodiments of the present disclosure.

Reference is made below to FIG. 7, which illustrates a schematic diagram of the structure of a computer system 700 suitable for implementing a terminal device or server of an embodiment of the present disclosure. The computer system 700 illustrated in FIG. 7 is merely an example and should not impose any limitations on the functionality and scope of use of embodiments of the present disclosure.

As shown in FIG. 7, the computer system 700 may include a processing apparatus (e.g., central processor, graphics processor, etc.) 701 that may perform various appropriate actions and processes based on programs stored in a read-only memory (ROM) 702 or loaded from a storage apparatus 708 into a random access memory (RAM) 703. Also stored in RAM 703 are various programs and data required for the operation of electronic device 700. The processing apparatus 701, ROM 702, and RAM 703 are connected to each other via bus 704. The input/output (I/O) interface 705 is also connected to the bus 704.

Typically, the following devices may be connected to I/O interface 705: input apparatus 706 including, for example, a touch screen, touch pad, keyboard, mouse, camera, microphone, etc.; output apparatus 707 including, for example, liquid crystal displays (LCDs), speakers, vibrators, etc.; storage apparatus 708 including, for example, magnetic tapes, hard drives, etc.; and communication apparatus 709. communication apparatus 709 may allow computer system 700 to communicate wirelessly or wired with other devices to exchange data. While FIG. 7 illustrates computer system 700 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication device 709, or from a storage apparatus 708, or from a ROM 702. When this computer program is executed by the processing apparatus 701, the above-described functions as defined in the method of the embodiments of the present disclosure are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

The above computer readable medium may be contained in the above electronic device; or it may exist separately and not assembled into the electronic device.

The above computer readable medium carries one or more programs which, when executed by the electronic device, cause the electronic device to implement the meeting information query method as illustrated in the embodiment shown in FIG. 3 and optional implementations thereof, and/or the meeting information query method as illustrated in the embodiment shown in FIG. 4 and optional implementations thereof.

Computer program code for performing the operations of the present disclosure may be written in one or more programming languages or combinations thereof, said programming languages including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The unit described in the embodiments of the present disclosure may be implemented by means of software or by means of hardware. For example, a request generation unit may also be described as "a unit that generates a meeting query request in response to a detected meeting query operation".

The above description is only a preferred embodiment of the present disclosure and an illustration of the technical principles employed. It should be understood by those skilled in the art that the scope of the disclosure covered by the present disclosure is not limited to a particular combination of the technical features described above, but should also cover other technical solutions formed by any combination of the technical features described above or their equivalent features without departing from the concept of the above disclosure. For example, the above features are interchangeable with (but not limited to) the technical features with similar functions disclosed in this disclosure.

What is claimed is:

1. A method of implementing efficient conference queries by a terminal device, comprising:
    detecting a conference query operation by the terminal device;
    presenting a language setting interface in response to detecting a preset language class setting operation;
    detecting an identifier of a current language for the terminal device set via the language setting interface;
    generating a conference query request based on a query statement corresponding to the conference query operation and the identifier of the current language for the terminal device;
    sending the conference query request to a server, wherein the server queries conference information in response to receiving the conference query request, the conference information comprises at least one information item, and the at least one information item comprises a conference identifier, a sequence of subtitle sentences, a sequence of time corresponding to each subtitle sentence in the sequence of subtitle sentences, and a sequence of language identifiers representing a language of each subtitle sentence in the sequence of subtitle sentences;
    receiving a set of conference query results determined by the server based on the query statement and the identifier of the current language for the terminal device; and
    presenting the set of conference query results, wherein the conference query results comprise a set of hit subtitle sentences and subtitle sentence time corresponding to each hit subtitle sentence, the set of hit subtitle sentences matches the query statement, and the set of hit subtitle sentences is in a language matching the current language of the terminal device.

2. The method according to claim 1, wherein the generating a conference query request comprises:
    presenting a set of conference information corresponding to a current login user identifier on a global conference information page; and
    generating the conference query request based on the query statement in response to detecting the query statement input by a user on the global conference information page.

3. The method according to claim 2, wherein the presenting the set of conference query results comprises:
    presenting each conference query result on the global conference information page; or
    jumping to a conference information detail page to present each conference query result.

4. The method according to claim 3, wherein the method further comprises:
    jumping to the conference information detail page in response to detecting a selecting operation on a hit subtitle sentence presented on the global conference information page, presenting the conference query result corresponding to the selected hit subtitle sentence on the conference information detail page, and playing a conference audio and video corresponding to the selected hit subtitle sentence from the subtitle sentence time corresponding to the selected hit subtitle sentence.

5. The method according to claim 2, wherein the method further comprises:
jumping to the conference information detail page in response to detecting a selecting operation on a target conference query result presented on the global conference information page, and presenting the target conference query result on the conference information detail page.

6. The method according to claim 5, wherein the method further comprises:
in response to detecting a selecting operation on a hit subtitle sentence in the target conference query result presented on the conference information detail page, playing a conference audio and video corresponding to the target conference query result on the conference information detail page from the subtitle sentence time corresponding to the selected subtitle sentence.

7. The method according to claim 1, wherein the set of conference query results further comprise to-be-highlighted content; and
the presenting the set of conference query results comprises:
presenting the to-be-highlighted content in each conference query result in a preset highlighting manner, and presenting non-to-be-highlighted content in each conference query result in a preset conventional display manner.

8. A method of implementing efficient conference queries, comprising:
receiving a conference query request sent from a terminal device, wherein the conference query request is generated by the terminal device based on a query statement and an identifier of a current language for the terminal device, and the identifier of the current language for the terminal device is detected via a language setting interface that is presented in response to detecting a preset language class setting operation;
querying conference information by a server in response to receiving the conference query request, wherein the conference information comprises at least one information item, and wherein the at least one information item comprises a conference identifier, a sequence of subtitle sentences, a sequence of time corresponding to each subtitle sentence in the sequence of subtitle sentences, and a sequence of language identifiers representing a language of each subtitle sentence in the sequence of subtitle sentences;
identifying a subset of conference information based on the query statement and the identifier of the current language for the terminal device, wherein each subtitle sentence in the subset of conference information matches the query statement, and each subtitle sentence in the subset of conference information is in a language matching the current language of the terminal device;
generating conference query results based on the subset of conference information to obtain a set of conference query results; and
sending the set of conference query results to the terminal device.

9. The method according to claim 8, wherein the method further comprises:
in response to receiving an audio and video playback request sent by the terminal device, sending conference audio and video data corresponding to the conference identifier in the audio and video playback request to the terminal device, starting from the subtitle sentence time in the audio and video playback request, wherein the audio and video playback request is triggered by the terminal device in response to a user's selecting operation on the conference query result in the set of presented conference query results.

10. The method according to claim 8, wherein the identifying a subset of conference information comprises:
determining degrees of matching between information items comprised in the conference information and the query statement; and
determining the subset of conference information based on the degrees of matching between the conference information items and the query statement.

11. The method according to claim 10, wherein the conference information further comprises phonetic annotation information of a preset number of languages corresponding to a basic text information item in at least one basic text information item; and
wherein the determining the degrees of matching between the information items comprised in the conference information and the query statement comprises:
determining a degree of matching between the basic text information item in the conference information and the query statement according to a degree of matching between the query statement and the basic text information item of the conference information or the phonetic annotation information of the language indicated by a language identifier corresponding to the basic text information item.

12. The method according to claim 11, wherein the conference information further comprises at least one of the following information items: conference title information and conference comment information; and the conference information comprises at least one of the following basic text information items: a participant name and the sequence of subtitle sentences.

13. The method according to claim 10, wherein the determining a degree of matching between the conference information and the query statement according to the degrees of matching between the information items comprised in the conference information and the query statement comprises:
for the conference information, weighting and summing the degrees of matching between the information items comprised in the conference information and the query statement according to preset weights of the information items comprised in the conference information, and determining the weighted sum result as the degree of matching between the conference information and the query statement.

14. The method according to claim 10, wherein the conference information is generated through the following steps:
for a sequence of to-be-stored subtitle sentences corresponding to a to-be-stored conference identifier and a corresponding sequence of to-be-stored subtitle sentence time, segmenting each to-be-stored subtitle sentence according to a segmentation method corresponding to the language class of the to-be-stored subtitle sentence, to obtain a sequence of subtitle sentence segments corresponding to the to-be-stored subtitle sentence;
generating the sequence of to-be-stored subtitle sentences by using the sequence of subtitle sentence segments corresponding to each to-be-stored subtitle sentence in order of appearance of the corresponding to-be-stored subtitle sentences in the sequence of to-be-stored subtitle sentences, where an element in the sequence of to-be-stored subtitle sentences is the sequence of subtitle sentence segments of the to-be-stored subtitle sentence corresponding to the element;

generating a sequence of to-be-stored subtitle language class identifiers by using a language class identifier corresponding to each to-be-stored subtitle sentence in order of appearance of the corresponding to-be-stored subtitle sentences in the sequence of to-be-stored subtitle sentences; and generating the conference information by using the to-be-stored conference identifier, the sequence of to-be-stored subtitle sentences, the sequence of to-be-stored subtitle sentence time, and the sequence of to-be-stored subtitle language class identifiers, and storing the conference information.

15. The method according to claim 10, wherein the generating conference query results comprises:

generating a set of conference query results by using a conference identifier in the subset of conference information, each hit subtitle sentence that matches the query statement, and subtitle sentence time corresponding to each hit subtitle sentence, wherein the generating a set of conference query results comprises:

marking information items matching the query statement among the information items comprised in the conference information as to-be-highlighted content of the conference information, and generating the set of conference query results by using each hit subtitle sentence in the subset of conference information, the corresponding subtitle sentence time, and the to-be-highlighted content.

16. A terminal device, comprising:

one or more processors; and a storage apparatus, storing one or more programs, wherein the one or more programs, when performed by the one or more processors, cause the one or more processors to implement operations, the operations comprising:

detecting a conference query operation by the terminal device;

presenting a language setting interface in response to detecting a preset language class setting operation;

detecting an identifier of a current language for the terminal device set via the language setting interface;

generating a conference query request based on a query statement corresponding to the conference query operation and the identifier of the current language for the terminal device;

sending the conference query request to a server, wherein the server queries conference information in response to receiving the conference query request, the conference information comprises at least one information item, and the at least one information item comprises a conference identifier, a sequence of subtitle sentences, a sequence of time corresponding to each subtitle sentence in the sequence of subtitle sentences, and a sequence of language identifiers representing a language of each subtitle sentence in the sequence of subtitle sentences;

receiving a set of conference query results determined by the server based on the query statement and the identifier of the current language for the terminal device; and presenting the set of conference query results, wherein the conference query results comprise a set of hit subtitle sentences and subtitle sentence time corresponding to each hit subtitle sentence, the set of hit subtitle sentences matches the query statement, and the set of hit subtitle sentences is in a language matching the current language of the terminal device.

17. The terminal device according to claim 16, wherein the generating a conference query request comprises:

presenting a set of conference information corresponding to a current login user identifier on a global conference information page; and generating the conference query request based on the query statement in response to detecting the query statement input by a user on the global conference information page.

* * * * *